United States Patent [19]

Volz

[11] 3,984,862
[45] Oct. 5, 1976

[54] TELEVISION RECEIVER RESPONSE INDICATING APPARATUS

[75] Inventor: LeRoy A. Volz, Bartlett, Ill.

[73] Assignee: Dynascan Corporation, Chicago, Ill.

[22] Filed: Feb. 5, 1975

[21] Appl. No.: 547,255

[52] U.S. Cl. .............................. 358/10; 178/DIG. 4; 324/121 R; 325/363; 328/188; 340/324 AD
[51] Int. Cl.² ...................... H04N 9/62; H04N 7/02
[58] Field of Search ................. 358/10; 178/DIG. 4, 178/7.5 R; 324/121 R; 328/187, 188; 340/324 A, 324 AD, 366 CA; 178/7.5 R; 325/363

[56] References Cited
UNITED STATES PATENTS

| | | | |
|---|---|---|---|
| 2,733,433 | 1/1956 | Morrison | 178/DIG. 4 |
| 3,253,216 | 5/1966 | Feldman | 324/121 R X |
| 3,401,331 | 9/1968 | Mussulman | 178/DIG. 4 |
| 3,588,696 | 6/1971 | Solvay | 324/121 R |
| 3,659,044 | 4/1972 | Olson | 178/DIG. 4 |
| 3,836,851 | 9/1974 | Schumann | 324/121 R X |
| 3,879,749 | 4/1975 | Baum | 358/10 |

*Primary Examiner*—Robert L. Griffin
*Assistant Examiner*—Mitchell Saffian
*Attorney, Agent, or Firm*—Wallenstein, Spangenberg, Hattis & Strampel

[57] ABSTRACT

The overall response of a television receiver is displayed on the face of the cathode ray tube of the receiver involved by test apparatus which requires electrical connection only to the antenna terminals of the television receiver and the mounting of a small light sensor unit onto the face of the cathode ray tube. The test apparatus generates an amplitude modulated signal having a video carrier frequency corresponding to that of a selected television channel. The amplitude modulated video carrier frequency signal includes an envelope containing synchronizing pulses for operating the sweep circuits of the television receiver in a normal manner and which clamps the automatic gain control circuits of the receiver to a desired level and a video signal to produce a given brightness reference background on the tube face which is preferably gray or black. Periodically, the main video carrier is interrupted for the generation of a constant amplitude test carrier frequency signal. This test carrier frequency signal progressively varies in frequency during successive fields, so the test carrier frequencies will scan through the entire band of frequencies for the channel involved. The points in time at which the main video carrier is periodically interrupted is controlled so that the beam trace or traces produce a rectangle of light resulting from the video signal detected from the test carrier frequency. This rectangle of light appears opposite the light sensor unit. The brightness of the rectangle of light during each field is a measure of the overall response of the radio frequency and intermediate frequency tuned circuits in the receiver at the test carrier frequency involved. The light sensor output from each field is stored and then utilized to modulate the video carrier to produce a response curve on a curve display area of the cathode ray tube.

22 Claims, 21 Drawing Figures

MARKER FREQUENCIES (I.F. FREQ)

F1 - 39.75 MHz ADJ.CHAN.PICTURE TRAP (FREQ)
F2 - 41.25 MHz SOUND TRAP  "
F3 - 41.75 MHz IF CHROMA SIDE BAND CARR. "
F4 - 42.25 MHz CHROMA SUB-CARRIER  "
F5 - 42.75 MHz IF CHROMA SIDE BAND CARR.(FREQ)
F6 - 45.00 MHz IF FREQUENCY  "
F7 - 45.75 MHz VIDEO CARRIER  "
F8 - 47.25 MHz ADJACENT CHAN. SOUND TRAP "

MARKER FREQUENCIES (I.F. FREQ.)

F1 - 39.75 MHz ADJ.CHAN.PICTURE TRAP(FREQ)   F5 - 42.75 MHz IF CHROMA SIDE BAND CARR.(FREQ)
F2 - 41.25 MHz SOUND TRAP                "   F6 - 45.00 MHz IF FREQUENCY                  "
F3 - 41.75 MHz IF CHROMA SIDE BAND CARR.  "   F7 - 45.75 MHz VIDEO CARRIER                 "
F4 - 42.25 MHz CHROMA SUB-CARRIER         "   F8 - 47.25 MHz ADJACENT CHAN. SOUND TRAP     "

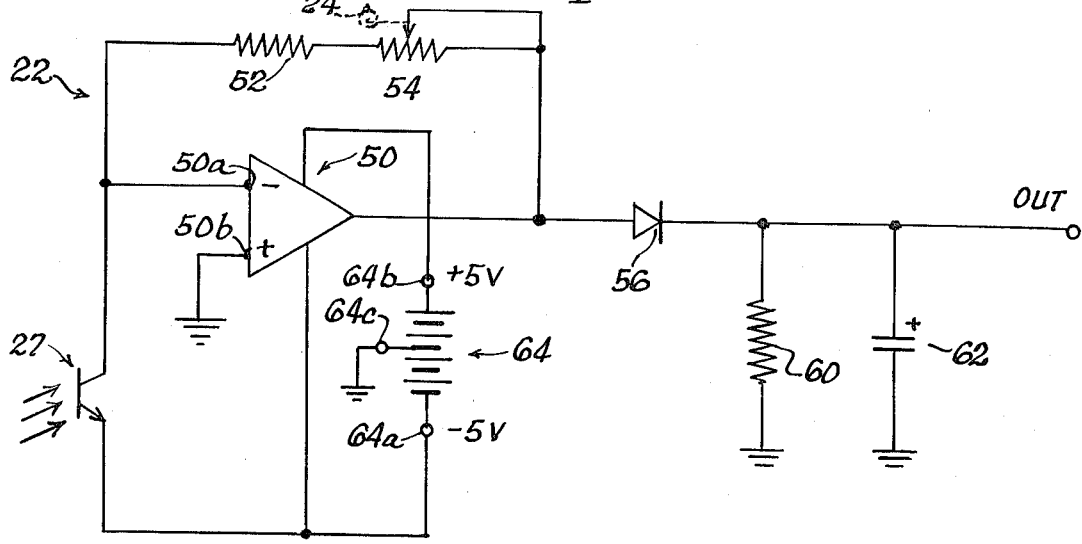

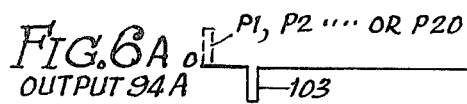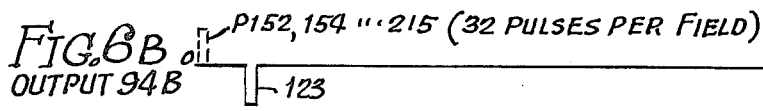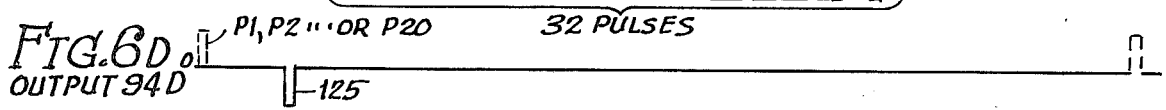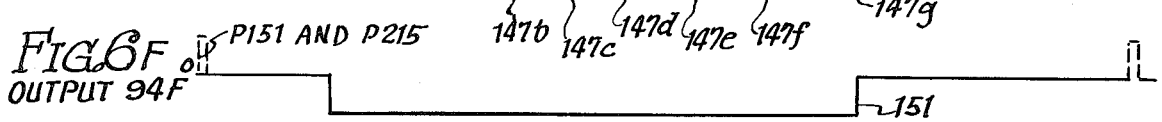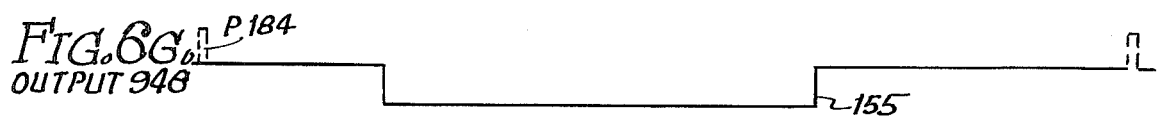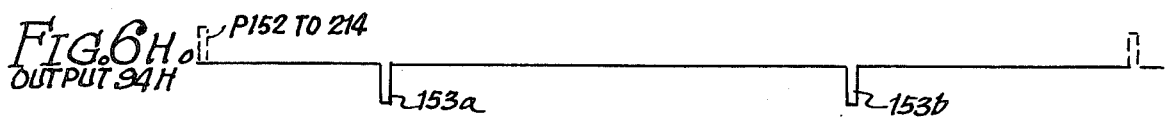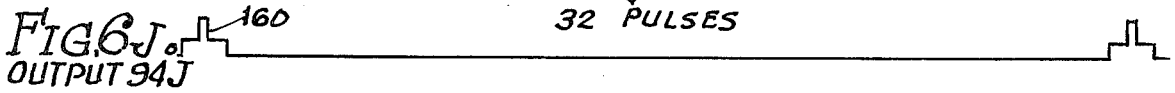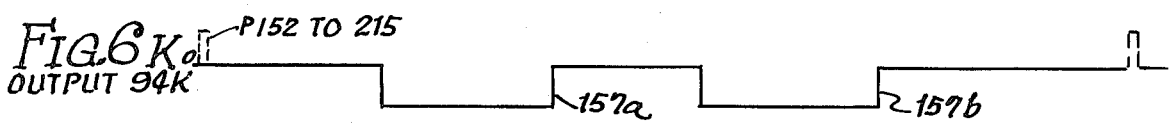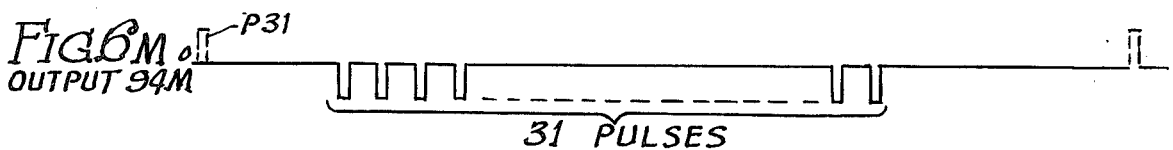

TELEVISION RECEIVER RESPONSE INDICATING APPARATUS

BACKGROUND OF INVENTION

This invention relates to apparatus which aids in evaluating and aligning the RF (radio frequency) and IF (intermediate frequency) circuits of television receivers.

The performance of modern television receivers, particularly color receivers, is greatly influenced by the overall amplitude-frequency response of the system. The color television broadcast system depends upon having a selected set of signal levels for the luminance, chrominance and sound signals at the video detector in the television receiver. Any alteration in the desired transmission characteristics of the system which results in upsetting the ratios of these signals can cause serious distortion or degradation in the quality of the color picture.

Ordinarily, the transmission system can transmit the luminance, chrominance and sound signals with relatively little alteration of their original ratios from the broadcaster's transmitter antenna, all the way to the mixer of the television receiver where they are translated into frequencies within the pass band of the IF amplifier. It is primarily the frequency response characteristic of the IF amplifier that determines these relative signal levels as they are detected for further processing. Consequently, the IF amplifier response characteristic is carefully specified and stringently controlled in television receivers designed for high quality color picture reproduction.

Severe demands on the IF amplifier response characteristic are imposed by the requirement that the IF pass band provide the principle selectivity of the receiver and therefore be capable of eliminating interference from the adjacent channel picture carrier and the co-channel and adjacent channel sound carriers. The high attenuation required at these frequencies is usually provided by a number of trap circuits. Television broadcast standards result in the frequency of these trap circuits being relatively close to the band edges of the desired picture channel. Thus, rather precise tuning of the trap circuits is generally necessary to achieve the required attenuation without disturbing the desired IF pass band characteristic. Furthermore, the tuning of the trap circuits may affect the delay characteristic within the IF pass band, which could also result in degradation of the color picture. Therefore, proper tuning of the trap circuits can be important to assure maximum color picture quality, even if adjacent channel interference is not anticipated in the broadcast reception area.

While the ratios of luminance, chrominance and sound signals at the picture detector are primarily determined by the IF response characteristic of the television receiver, it is possible for these ratios to be upset by other elements of the broadcast transmission system, such as multipath, antenna or cable response and RF tuner response. Therefore, it may be desirable in analyzing and diagnosing problems in a color television system to be able to quickly verify that the receiver response is proper.

Prior art methods of verifying and aligning television receiver frequency response require the need for oscilloscope as well as sweep generator and test signal generating equipment. The signal generator equipment supplies either a swept RF signal at the antenna terminals or a swept IF signal which is normally applied to the mixer input, which encompasses the frequency band of a television channel. The oscilloscope equipment is connected to the video detector output to display a curve which corresponds to the response versus frequency. In order to identify on the cathode ray tube of the oscilloscope equipment the frequencies of interest at which the output levels are to be verified or adjusted, some means of adding "markers" is required. This may be done with a separate instrument or provision for markers may be included in the sweep generator equipment. It is also necessary to disable the receiver's automatic gain control system (AGC) so that the amplifier gain will not vary during the sweeping interval and distort the response characteristic. This is usually done by "clamping" the AGC bus at some voltage corresponding to a typical received signal level, or at a level specified by the receiver manufacturer. A variable voltage source is required for this and may be provided by a separate power supply or built in as a convenience feature of the sweep generator equipment.

From the above, it can be seen that verification and alignment of a television receiver response requires the use of a multiplicity of sophisticated instruments and, in accordance with prior art techniques, considerable interconnection of the equipment involved directly to the internal circuitry of the receiver. This requires the tedious removal of the receiver chassis from its cabinet and location of connecting terminals on the chassis by reading parts of the maintenance manual for the particular receiver involved. Because of the required skill and detailed knowledge of the receiver construction, frequency response evaluation and alignment is usually undertaken, only when other remedial efforts have failed and unacceptable picture degradation is judged to have resulted from improper frequency response. Very often a poor picture will be tolerated or improvement will not be offered by the service technician because he cannot quickly verify the need for alignment or does not wish to remove the receiver from the home to a service shop where the instrumentation is available. Thus, it can be seen that a means for simply and quickly verifying and aligning the receiver response would be of great value in the maintenance and servicing of color television receivers.

Also, before a receiver is returned from the service shop to the customer, it would be useful to have a rapid means of checking the unit for proper alignment. This is particularly true of a color television chassis which is removed from the cabinet and brought to the service shop without the picture tube. The set is checked out with a "test jig" which includes a cathode ray tube which substitutes for the units own picture tube. However, because of the cables and adapters used and the resulting possible mismatching, it is not possible to make an evaluation of receiver performance by judging picture quality on a test jig.

Consequently, it is an object of this invention to provide a method and a means for verifying and evaluating the frequency response of a television receiver without necessity of making any internal connections to the receiver.

It is also an object of this invention to provide a method and means for checking the alignment of a television receiver without making any connections to the internal circuits of the receiver, with no more knowledge of the receiver construction than the location of the antenna terminals, and to make it possible for alignment to be carried out with no more knowledge of the receiver construction than the location of the various adjustable tuning elements of the amplifier system.

It is a further object of this invention to make possible the display, evaluation and alignment of a television receiver frequency response under dynamic signal conditions with the receivers AGC circuits fully operative.

SUMMARY OF INVENTION

In accordance with one feature of the invention, a small light sensor unit is provided mountable by suction cups or other means on the face of the cathode ray tube so a major portion of the cathode ray tube is still visible. A unique amplitude modulated signal generating system is connected to the antenna terminals of the television receiver. Unlike the continuously swept test carrier signal of the prior art response testing systems which had no synchronizing pulses, the output of the amplitude modulated signal generating system of the invention generates an almost continuous fixed main video carrier frequency signal including an envelope containing synchronizing pulses for operating the sweep circuits of the television receiver, to cause the one or more beams of a monochrome or color cathode ray tube to sweep horizontally over the face of the tube during each sweep field period, and which clamps the automatic gain control circuits of the receiver to a desired level to produce a given reference background on the tube face which is preferably gray or black. Periodically, the main video carrier is interrupted for the generation of a constant amplitude test carrier frequency signal. This test carrier frequency signal is progressively varied in frequency during successive field periods, so the test carrier will scan in steps the entire band of frequencies for the channel involved. The points in time during each field at which the main video carrier is periodically interrupted is controlled to produce a rectangle of light opposite the sensor unit whose brightness during a single field is a measure of the output of the video detector of the receiver for the test carrier frequency involved. This rectangle of light will be referred to as the test frequency response display area. Thus, the various light intensities occurring during successive fields on the test frequency response display area represent the variations in the amplitude of the overall response curve of the receiver circuit over a spectrum of test carrier frequencies encompassing the entire frequency band of the television channel involved.

The light sensor output is stored and then utilized to produce, preferably on the face of the cathode ray tube of the receiver so an oscilloscope is not needed, a curve of the overall response of the receiver to the spectrum of frequencies involved. This spectrum is preferably repeatedly scanned by the test apparatus of the invention so that the stored light sensor data and the curve produced thereby are continuously updated, so alignment adjustment can be made as the response curve is viewed.

Where the use of a separate oscilloscope is to be avoided, the main fixed frequency video carrier is amplitude modulated by the stored information from the light sensor output to produce the overall response curve on a visible curve display area of the cathode ray tube. In addition to spots of light which form the overall response curve, there are preferably also produced by suitably timed modulation of the video carrier marker lines which identify reference frequencies on this curve. In a further feature of the invention, the "stop band" portions of the curve display area which display the frequencies in which the trap circuits are operative can be given a background intensity which contrasts with the preferably much darker background intensity of the "pass band" portions of the curve display area. Controls are provided which permit the amplitude scale factor of the response curve in the trap frequency or stop band regions of the curve to be varied independently of the rest of the curve, so that trap frequency adjustments can be readily made. Since the response in the stop band regions may be of a very small magnitude, it is difficult to make accurate trap circuit adjustments unless the scale factor is increased in these regions of the curve. It is convenient to vary this scale factor in these stop band regions without disturbing the scale factor in the pass band region of the curve therebetween. Means are provided so that the controls which change the scale factor at the stop band regions of the response curve automatically produce the lighter background areas in these regions so that the observer is aware of any scale change.

Other aspects of the invention deal with the simple and reliable manner in which the output of the light sensor unit is stored and converted to control signals which modulate the video carrier of the amplitude modulated signal fed to the antenna terminals of the receiver.

DESCRIPTION OF DRAWINGS

FIGS. 3A, 3B and 3C show the signal which is fed to the antenna terminals of the television receiver shown in FIG. 1 during the fields and horizontal sweep lines indicated thereon;

FIG. 4 is an electrical circuit diagram of the electrical portions of the light sensor unit of FIGS. 1 and 2;

FIGS. 6A–6N illustrate the control signal waveforms present on the outputs 94A–94M respectively of the synchronizer and timing control circuit 94 shown in FIG. 5A.

EXEMPLARY EMBODIMENT OF INVENTION

Figure 1:
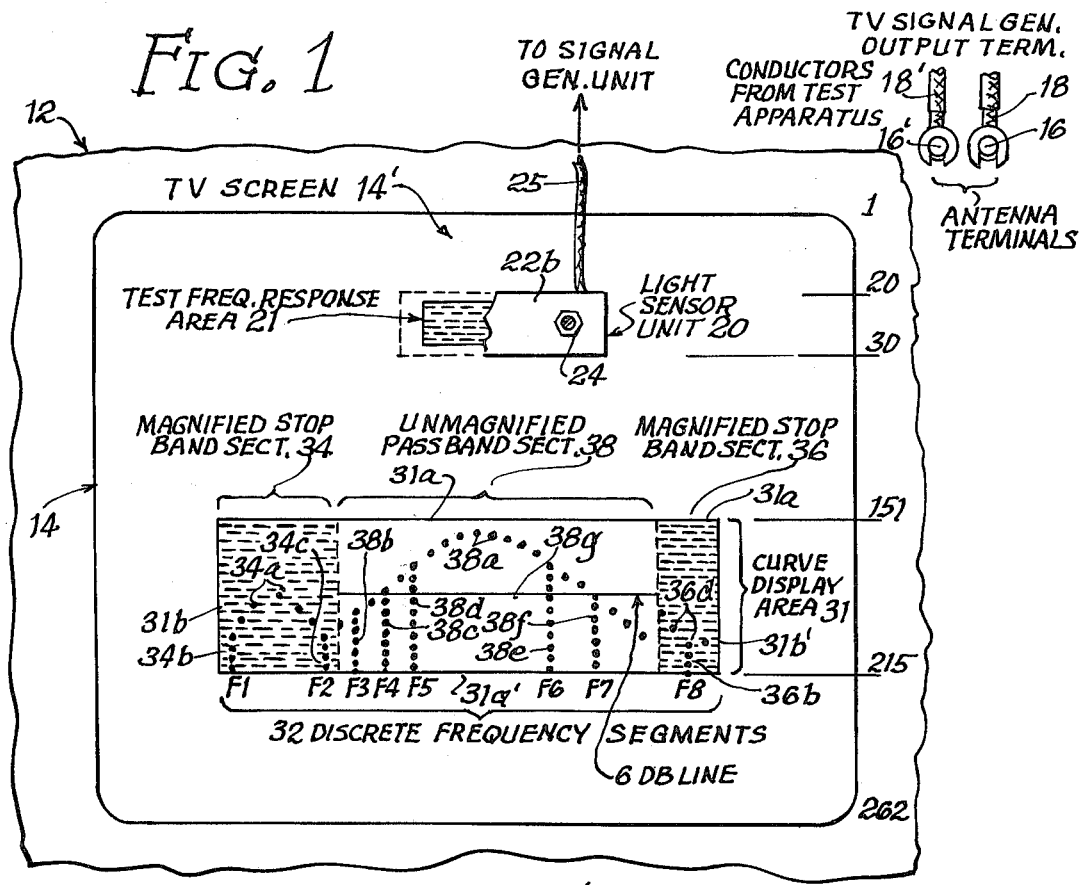
FIG. 1 is a broken away view of the front of a television set showing the face of the cathode ray tube thereof, a light sensor unit which has been attached to and occupies a small portion of the upper portion of the face of the cathode ray tube and visible displays produced by the present invention on the face of the cathode ray tube in a test frequency response display area and a curve display area thereof.
Figure 2:
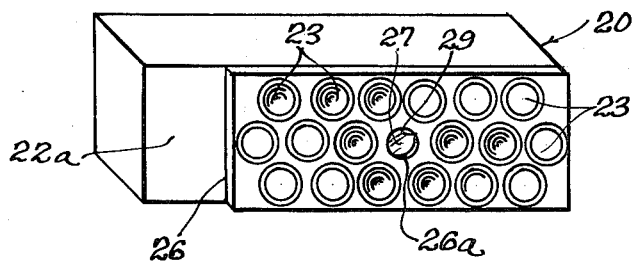
FIG. 2 is a perspective view of the rear of the light sensor unit shown in FIG. 1.
Figure 5A:
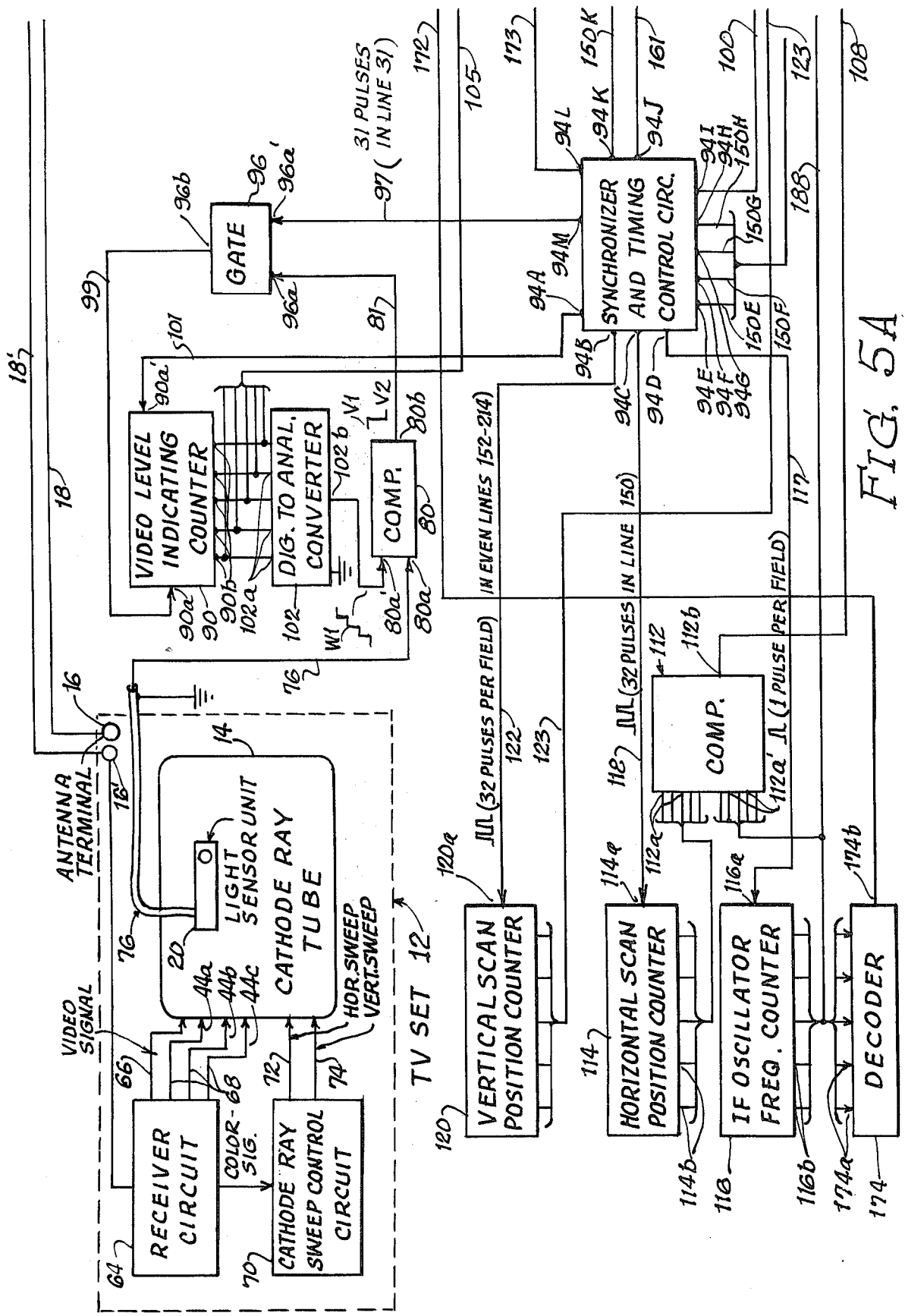
FIGS. 5A and 5B together form a logic block diagram of the test apparatus which produces the signal fed to the antenna terminals of the television receiver shown in FIG. 1 and responds to the electrical output of the light sensor unit of FIGS. 1 and 4.
Figure 5B:
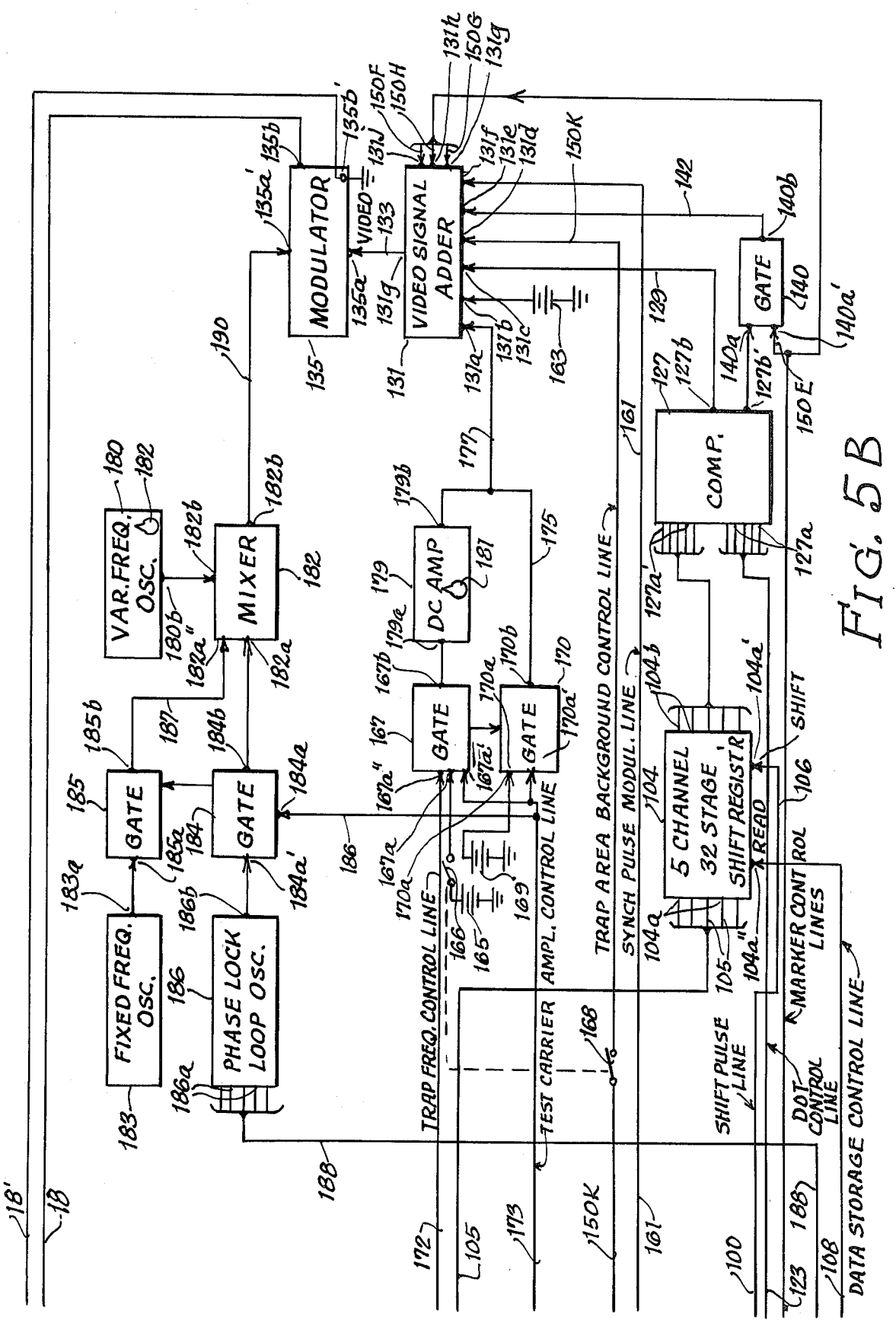

Refer now more particulary to FIGS. 1 and 2 which indicate the electrical and physical connections which are made when applying the test apparatus of the present invention to a conventional color television receiver unit 12 having a conventional color cathode ray tube 14 and antenna terminals 16–16'. A pair of conductors 18–18', extending from a unique signal generator unit whose basic circuits are shown in FIGS. 5A and 5B, are connected to the antenna terminals 16–16'.

The test apparatus of the invention, in addition to the signal generator unit, includes a light sensor unit 20 mounted opposite a test frequency response display rectangular area 21 on the face 14' of the cathode ray tube 14. The light sensor unit 20, which is of relatively small size in comparison to the area of the cathode ray tube face 14', may be held in position over the test frequency response display area 21 on the face of the cathode ray tube in any suitable way, such as by suction cups 23 (see FIG. 2) secured to the rear wall 22a of the housing 22 of the light sensor unit. An adjusting control knob 24 projects from the front wall 22b of the housing 22 to adjust the amplitude of the output of the light sensor unit 20 for a given light intensity appearing on the test frequency response display area 21. In a manner to be described, the beam traces on the face of the cathode ray tube 14 provide a light level within the said area 21 which varies in intensity with the particular test carrier frequency which is fed to the antenna terminals 16–16' during each field period. (As is well known, the beams of a cathode ray tube of a typical television receiver are swept horizontally across the face of the cathode ray tube during each sweep line, with successive sweep lines located progressively down the face of the tube. The period required for the beams to complete their movement once over the face of the cathode ray tube will be referred to as the field period. In describing line positions which the beams can occupy on the face of the cathode ray tube, reference will be made to beam line or beam line position numbers. Since one television picture field scan comprises 262 lines, beam line or beam line position No. 1 will be assumed to be located at the very top of the face of the cathode ray tube, and beam line or beam line position No. 262 will be assumed to be located at the bottom of the face of the cathode ray tube, with beam line or beam line position Nos. 2-261 being located in positions corresponding to their numbers between the upper and lower margins of the face of the cathode ray tube.)

As illustrated in FIG. 1, a test frequency response display in the form of a rectangle of light in the area 21 is formed by the beams as they scan the middle segments of beam line Nos. 20–30. A given test carrier frequency signal is fed to the antenna terminals 16–16' during the intervals corresponding to the movement of the beams over the test frequency display area 21, and the light intensity of the beam traces within the rectangle will be inversely proportional to the overall response of the receiver circuits to the test carrier frequency involved.

As shown in FIG. 2, the suction cups 23 are integrally formed and molded with a body 26 of synthetic plastic material which has an aperture 26a therein aligned with an aperture 29 in the rear wall 22a of the light sensor unit housing 22, to expose a light sensing device 27 acting as a variable generator or resistor, depending upon the intensity of the light involved. It is preferred that the light sensor unit 20 include within the housing 22 integrated circuits and other circuit elements illustrated in FIG. 4, which include a sample and hold circuit which will produce a direct current voltage which is maintained for a number of sweep lines after the beams leave the beam line position Nos. 20–30 occupied by the frequency display area 21. Accordingly, when the beams reach, for example, beam line position No. 31 on the face of the cathode ray tube 14, in the preferred manner to be explained in connection with the description of FIGS. 5A and 5B, the output of the light sensor unit 20 is converted to binary digital signals. The binary signals are preferably temporarily stored in a counter where it is subsequently transferred perferably to a recirculating shift register, after the beams have left the latter beam line position No. 31, such as during the beam movement over beam line position No. 150.

After a number of successive fields have occurred, 32 in the present example, the frequencies of the test carrier signal have scanned throughout the spectrum of the frequencies of the television channel involved and the aforementioned shift register will contain data on the response of the receiver circuits to the various frequencies in the spectrum involved. As previously indicated, the test carrier frequency signals repeatedly scan the spectrum of frequencies so the data stored in the shift registers is updated continually.

In accordance with a specific aspect of the invention, the horizontal positions of the beams upon the face of the cathode ray tube 14 are synchronized to the shifting of the light sensor output data stored in the recirculating shift registers, so as to aid in utilizing such data to reconstruct a frequency response curve of the receiver involved in an area of the face of the cathode ray tube 14, referred to as the curve display area 31. The output of the light sensor unit 20 is read into the aforesaid recirculating shift register at appropriate times during the circulation period of the data in the shift register, so the test carrier frequency which produces the binary data in the data sensing position of the shift register corresponds to the frequency assigned to the horizontal position of the beams at that instant of time.

The curve display area 31 in the exemplary embodiment of the invention being described will be assumed to occupy beam line position Nos. 151–215. The points of this area spaced progressively increasing vertical distances above the bottom margin of this area represent progressively increasing response magnitudes, and points in this area spaced progressively increasing distances to the right of the left margin of this area represent progressively increasing frequencies. As illustrated, in the preferred form of the invention, the curve display area 31 has left and right marginal sections 34 and 36 referred to as magnified stop band sections and an intermediate section referred to as an unmagnified pass band section. Where the test carrier frequency is repeatedly varied over the spectrum of frequencies involved for the television channel in 32 steps (as in the described example of the invention), the beams horizontally traversing the area 31 will pass 32 discrete segments thereof assigned respectively to the 32 test carrier frequencies involved. In a manner to be described, the main video carrier portions of the amplitude modulated signal fed to the antenna terminals 16–16' (to be contrasted with the test frequency carrier portions thereof) are modulated in accordance with the data stored in the aforementioned shift register, to produce 32 response indicating display dots. These response indicating display dots in the magnified stop band segment 34 are identified by reference numeral 34a, in the pass band section by reference numeral 38a and in the magnified stop band segment 36 by reference numeral 36a. The frequencies associated with the magnified stop band sections 34 and 36 of the curve display area 31 are those frequencies with which the trap circuits of the receiver are associated. The trap circuits provide a sharper cut-off in the stop band regions of the response curve of the receiver than would otherwise be the case, to eliminate interference from co-channel sound and adjacent channel sound and picture carriers. The dots associated with particular test carrier frequencies of interest (f1, f2, f3, f4, f5, f6, f7 and f8, which are identified by the intermediate frequencies produced thereby in FIG. 1) are identified or marked by vertical lines 34b, 34c, 38b, 38c, 38d, 38e, 38f and 36b. These line markers are produced by modulating the main video carrier of the signal fed to the antenna terminals 16–16' at the appropriate times when the beams move along the appropriate frequency segments of the curve display area 31. Additionally, in the preferred form of the invention, the curve display area 31 has a horizontal 6db amplitude reference line 38g, and is separated from the surrounding portions of the cathode ray tube by horizontal framing lines 31a–31a' and vertical framing lines 31b–31b'. These reference and framing lines are produced also by suitably timed modulations of the video carrier of the signal fed to the antenna terminals 16–16'.

While not necessary in accordance with the broader aspects of the invention, when they are magnified, the stop band sections 34 and 36 are given a contrasting background to the background of the unmagnified response section 38, so that those frequencies associated with the trap circuits are readily separable from the other frequencies identified in the unmagnified response section 38 of the curve display area 31 and scale changes are noted. Also, a control is provided for selectively varying the amplitude scale factor or amount of magnification of the response of the receiver circuits to the test carrier frequencies associated with the trap circuits. This control automatically causes the background of the stop band sections to become brighter than the pass band section when magnification is being utilized. As shown on the drawing, the scale factor of the frequency response of the frequencies assigned to the stop band sections 34 and 36 have been magnified in comparison to that of the frequencies in the unmagnified pass band section 38 about twenty or more times, to make the trap frequency portions of the response curve readily visible, to facilitate evaluation and tuning of the trap circuits.

As previously indicated, in test apparatus heretofore developed for indicating the overall response of a television receiver, the signal fed to the antenna terminals of the television receiver was one having a continuously varying frequency which swept over the spectrum of frequencies involved for the particular television channel to which the receiver had been tuned. In such case, the output of the video detector was fed to a separate oscilloscope whose sweep controls had to be adjusted to form a response curve pattern on the face of the cathode ray tube thereof, and, as previously explained, access to various portions of the circuitry of the receiver was necessary. Examples of the unique amplitude modulated signals fed to the antenna input terminals 16–16' in the unique test apparatus of the present invention, where no access to the internal circuitry of the receiver is necessary and the receiver cathode ray tube 14 is utilized, are shown in FIGS. 3A, 3B and 3C to which reference should now be made. These signals will produce a black and white display on the face of the cathode ray tube 14 since they contain no color producing signals.

FIG. 3A shows the amplitude modulated signal fed to the antenna terminals 16–16' when the beams are moving along beam line position Nos. 20 to 51 in a given field period. This amplitude modulated waveform generally indicated by reference numeral 40 has an envelope which includes synchronizing pulses like P20, P21, P50 and P51, shown in FIG. 3A, which, in accordance with conventional television techniques, synchronize operation of a horizontal sweep circuit in the television receiver, which circuit initiates a beam sweep movement from one side of the cathode ray tube. (The number following the letter P is the beam position line number identifying the location of the beam traces produced by the synchronizing pulses involved. Thus, the synchronizing pulse P20 initiates the movement of the beam traces along beam position line No. 20, synchronizing pulse P21 initiates the movement of the beam traces along beam line position No. 21, etc.)

The amplitude modulated signal 40 has a main video frequency carrier modulated to produce the synchronizing pulses reference to, and envelope portions 40a between successive synchronizing pulses. This carrier is generated at the video carrier frequency of the television channel involved. Such video carrier frequency produces within the receiver what is referred to as the intermediate (IF) picture carrier frequency of a typical commercial television receiver, which is 45.75 megahertz. During the period when the beams are moved over the test frequency response display band area 21 (i.e. at exemplary beam line position Nos. 20–30), the amplitude modulated signal at the video carrier frequency is interrupted, and the aforementioned test carrier frequency generated to produce an envelope portion 40b during each beam line. As previously indicated, during each new sweep field period, the test carrier frequency which produces the envelope portion 40b is stepped to a new test frequency until the entire spectrum of frequencies to be tested is covered, whereupon the scanning operation is repeated.

The amplitude of the main video frequency carrier producing each envelope portion 40a is shown as having an amplitude slightly below the black producing level 42, so as to produce on the face of the cathode ray tube a given background gray intensity. (In television receivers, utilizing U.S.A. N.T.S.C. standards, the smaller the detected video signal the more intense or brighter is the beam trace at the moment involved.) The peak amplitude of the video frequency carrier during synchronizing pulses is maintained constant so as to stabilize or clamp the automatic gain control circuits of typical "keyed AGC" type receivers. The behavior of these keyed AGC systems is such that the various modulations of the video frequency carrier between synchronizing pulses do not affect this stabilization of the automatic gain control circuits.

The amplitude of the test frequency carriers assigned to the pass band response section 38 of the curve display area 31 is stabilized at a given reference level which, is illustrated, is located between the maximum white level 44 and the black level 42. The amplitude of the test frequency carriers assigned to the stop band sections 34 and 36 can be increased many times from this reference level so that an appreciable signal can be detected therefrom. The detection of envelope portions 40b produces a signal fed to the beam intensity control circuit of the cathode ray tube which, as previously indicated, will generally produce a beam intensity in the area 21 which is inversely proportional to the voltage detected therefrom.

FIG. 3B shows the waveform of the amplitude modulated signal fed to the antenna terminals 16–16' during a field different from that shown in FIG. 3A. Thus, the test frequency carrier producing the envelope portions 40b' is a different frequency F2 from frequency F1 producing the envelope portions 40b of the waveform shown in FIG. 3A.

The amplitude modulated signal waveform 40'' shown in FIG. 3C shows the amplitude modulated signal waveform appearing on the antenna terminals 16–16'' when the beams are moved along beam line position Nos. 180 to 191, where the display in the curve display area 31 is produced. The carrier producing the entire waveform illustrated is at the aforementioned main video carrier frequency which produces the picture or video carrier intermediate frequency of 45.75 megahertz in a conventional television receiver. The waveform 40'' has envelope portions producing synchronizing pulses P180, P181 . . . P190 and P191 which initiate the movement of the beams along beam line positions 180, 181, 190 and 191 respectively. These synchronizing pulses are produced at a given reference carrier peak amplitude to stabilize the automatic gain control circuits, as described. Carrier envelope portions are momentarily interrupted at envelope points like 40c'', 40d'', 40e'', 40f'', 40g'', 40h'', 40j'' and 40k''. For example, envelope points 40c'' and 40f'' where the amplitude suddenly momentarily decreases produce bright spots along the margin line 31b, envelope point 40d'' produces the amplitude reference line 38g, envelope points 40e'' and 40k'' produce points on the margin line 31b' of the curve display area 31, and envelope points 40g'', 40h'', 40j'' produce two of the dots 38a in the unmagnified pass band section 38 of the curve display area 31 and one dot in the stop band section 36.

Now that basic features of the invention have been reviewed, there will now be described the circuit diagram of FIG. 4 showing the electrical portions of an exemplary light sensor unit 22, and the block diagram of FIGS. 5A and 5B showing an exemplary block diagram of the reference test apparatus of the invention and its connections to a typical television receiver. FIGS. 6A–6M illustrate various control signals generated by the synchronizer and timing control circuit shown in FIG. 5A.

As previously indicated, the light sensor unit 22 preferably includes within the aforementioned light sensor unit housing 22 a sample and hold circuit 57 which will store for a short period the output generated by the light responsive device 27 so that an analog to digital conversion operation can be carried out after the beams have left the test frequency display area 21. For example, this operation may be carried out when the beams are traversing beam line position No. 31 on the face of the cathode ray tube 14. As shown in FIG. 4, one of the terminals of the light responsive device 27 is coupled to the input 50a of a suitable operational amplifier 50 including a feedback circuit comprising an adjustable resistor 54 and a resistor 52 forming a feedback amplifier. The other terminal of the device 27 is connected to a negative terminal 64a of a DC voltage supply 16 having a positive terminal 64b connected to the operational amplifier 50 and a grounded reference voltage terminal 64c. The amplifier 50 has an input 50b which is connected to ground. The control knob 24 exposed on the front wall 22b of the light sensor housing 22 adjusts the value of the resistor 54 to vary the output of the amplifier 50. The output of the amplifier 50 is coupled through a rectifier 56 to the sample and hold circuit 57 which can take a variety of forms. As illustrated, it includes a resistor 60 coupled between the cathode of the rectifier 56 and ground. A capacitor 62 is connected in parallel with the resistor 60 to temporarily store a voltage to which it changes.

Exemplary values for the various impedance elements shown in FIG. 14 may be as follows:
Resistor 54 – between 0 and 10K ohms
Resistor 52 – 1000 ohms
Resistor 60 – 10K ohms
Capacitor 62 – 0.1 microfarads In FIG. 5A there is shown a block diagram of the components of the television receiver 12. As there shown, the television receiver includes, in addition to the cathode ray tube 14, cathode ray tube sweep circuit 70 which receives detected synchronizing pulses from the detected output of the receiver circuit 64 whose input is connected to the antenna terminals 16–16'. The receiver circuit 64 includes the usual input RF amplifier mixer and intermediate frequency amplifier stages, and other circuits which produce a video signal for an output line 66 which is fed to the intensity control grids of the electron guns forming part of the cathode ray tube 14, and color signal output lines 68 which, when a color signal is present, couples intensity control signals which determine the intensity of the various beam traces. The cathode ray tube sweep circuit 70 produces horizontal sweep signals on a line 72 and vertical sweep signals on a line 74 respectively extending to the horizontal and vertical deflection coils of the cathode ray tube 14.

In describing the block diagram of the signal generating and signal responding portion of the test apparatus of the present invention shown in FIGS. 5A and 5B, the interconnections between the various circuits thereof will, for the most part, be shown by single lines representing ungrounded signal carrying conductors. It is to be understood that the feeding of voltages and currents requires basically two lines, one line and a common or ground point for interconnecting various circuits. These so-called reference or ground points will not be generally shown on the block diagram for purposes of simplicity.

The cable extending from the light sensor unit 20 has an ungrounded conductor 76 extending to the input 80a of a voltage comparator circuit 80 which, in a manner to be explained, compares the magnitude of the voltage at the input 80a with the magnitude of a step voltage waveform W1 fed to the other input 80a' of the comparator 80. Normally, the output of the comparator 80 has a given value of V1 when the voltage at input 80a is greater than the voltage at input 80a', and drops to a lower gate closing level V2 when the voltage at input 80a' reaches or exceeds the voltage at input 80a. Comparator circuits which operate in the manner just explained are well known in the art.

The comparator circuit 80 has an output terminal 80b which is connected by a conductor 81 to the input 96a of a control gate 96 whose other input 96a' is connected by a conductor 97 to output terminal 94M of a synchronizer and timing control circuit 94. The output signal appearing at the output terminal 94M is shown in FIG. 6M and comprises, during the interval when the beams are moving along beam line position No. 31 (or any other selected suitable line position), 31 pulses which effect the generation of 32 different progressively increasing amplitude levels of the stepped waveform W1 by a digital to analog convertor 104.

When the gate 96 is open, these pulses are fed from an output terminal 96b of the gate 96 through a conductor 99 to the count input terminal 96a of a video level indicating counter 90. The gate 90 is closed to stop the count of the counter 90 when the comparator output drops to the level V2.

The counter 90 may be a conventional five-stage binary counter which produces on five output lines 90b a binary signal corresponding to the count in the counter, which is reset to zero each time it is reset by the feeding of a reset pulse to a reset input terminal 90a' thereof. Reset input terminal 90a' is coupled by a conductor 101 to an output terminal 94A of the synchronizer and timing control circuit 94 at which output terminal there appears, once near the beginning of each field, a reset pulse 103 as shown in FIG. 6A. Therefore, during the interval of time when the beams are moving between beam line positions NOS. 1–20, a pulse 103 appears which resets the counter 90. The binary output lines 90b of the counter 90 are fed to the input terminals of a conventional digital to analog converter 102 which converts the binary input signal to the stepped waveform W1 at an output terminal 102b thereof as the count progressively increases in the counter 90. It should now be apparent that when the beams have left beam line position No. 31 in the exemplary form of the invention being described, the video level indicating counter 90 has a count stored therein which is a measure of the brightness of the beam traces produced in the test frequency display area 21 of the cathode ray tube face during the sweep field period involved.

The next operation to be performed is the storage of the level indicating counter output in a 5-channel or bit, 32 stage, shift register 104 (see FIG. 5B). As shown, the five output lines 90b of the counter 90 are fed via conductors 105 to five binary signal input terminals 104a of the shift register 104. The shift register 104 may be a conventional circulating shift register which circulates the 5 binary bits of 32 binary coded signals representing the 32 different outputs of the counter 90 during the 32-step scanning of the spectrum of frequencies involved by the test frequency carrier portion of the signal fed to the antenna terminals of the television receiver. The binary word information stored in the various corresponding groups of stages of the five channels of the shift register are shifted to the succeeding stages thereof each time a shift pulse is fed to a shift pulse input terminal 104a'. The binary coded word information fed to the input terminals 104a of the shift register 104 is read into a corresponding group of stages of the shift register channels when a read pulse is fed to a read input terminal 104a''. The shift register has output terminals 104b extending to any selected group of stages of the shift register channels where readout is to occur. In the present example of the invention being described, it will be assumed for purposes of simplicity that the same stages are involved for read-in and readout operations.

The shift pulse input terminal 104a' is connected by a line 106 to the output terminal 94I of the synchronizer and timing control circuit 94. As shown in FIG. 6I, a group of 32 pulses is fed to this input terminal when the beam traces are being moved along each beam line position NO. 150–215. (Note that beam line position No. 151 constitutes the beginning of the curve display area 31 and beam line position No. 215 constitutes the end of the curve display area 31.) The 32 pulses generated during the movement of the beam traces along beam line positions NOS. 150–215 are synchronized with the movement of the beam traces along the 32 different frequency assigned segments constituting the width of the curve display area 31. In a manner to be described, the information temporarily stored in the video level indicating counter 90 which indicates the response to a particular test carrier frequency will have a position within the data being circulated in the shift register 104 corresponding to the test carrier frequency involved.

The read input terminal 104a'' of the shift register 104 is coupled by a line 108 to the output terminal 112b of a comparator circuit 112. The comparator circuit 112 has a group of five input terminals 112a connected to the corresponding binary signal output terminals of a horizontal scan position counter 114. The comparator 112 has a second group of binary signal input terminals 112a' which are connected to the corresponding binary output terminals 116b of an IF oscillator frequency counter 116. The horizontal scan position counter 114 has a count pulse input terminal 114a connected by a line 118 to the output terminal 94C of the synchronizer and timing control circuit 94 which produces the waveform shown in FIG. 6C, which has 32 pulses equally spaced to occur when the beams are moving along beam line position No. 150.

The horizontal scan position counter 114 is a self-resetting counter which resets itself to zero each 32 pulses and which has a count therein at any particular instant which corresponds to the frequency assigned to the corresponding segment in which the beam traces are moving at the instant involved. Thus, when the beams are moving at a point along beam line position No. 150 opposite the first segment of the curve display area which represents the lowest IF frequency of 39.75 megahertz, the position of the binary signals in the shift register 104 is such that data read into the group of stages of the shift register which receive the read-in binary code word will be inserted therein at a point in the pattern of information in the shift register assigned to this frequency. The number then stored in the horizontal scan position counter 114 is No. 0 identifying the first frequency which is to be indicated in the curve display area 31. Similarly, count No. 1 in the horizontal scan position counter 114 occurs when the beams are moving along beam line position No. 150 opposite the second frequency-assigned segment of the curve display area 31, which frequency is 40 megahertz. The count of the IF oscillator frequency counter 116 is proportional to the frequency of the test carrier which was generated during the sweep field period involved, which can be a number corresponding to any one of the 32 different frequencies which are utilized to scan the spectrum of frequencies to be covered by the response curve involves. Thus, if the test carrier frequency which was generated during the field period was the aforementioned frequency of 39.75 megahertz assigned to the first frequency-indicating segment of the curve display area, the number stored in the IF oscillator frequency counter could be the number 0. If, on the other hand, the last generated test carrier frequency was that assigned to the 15th segment of the curve display area, the number store in the IF oscillator frequency counter would be the number 14.

The IF oscillator frequency counter 116 is a self-resetting counter which resets itself to zero every 32 pulses fed to the count input terminal 116a thereof.

The count input terminal 116a is connected by a line 117 to the output terminal 94D of the synchronizer and timing control circuit 94. As shown in FIG. 6D, the signal appearing at the output terminal 94D is a single pulse 125 occurring once per sweep field period during the movement of the beams over any one of the beam line positions Nos. 1–19.

When the binary coded signals fed to the two groups of input terminals 112a and 112a' of the comparator 112 are identical, the output of the comparator at output terminal 112b will drop from a relatively high to a relatively low value. This output signal is coupled by the aforementioned conductor 108 to the shift register read input terminal 104a'' to read-in the data then stored in the video level indicating counter 90.

As previously indicated, the various beam traces occurring in the curve display area 31 are provided by amplitude modulating the main video frequency carrier of the signal fed to the antenna input terminals 16–16' while the beams are traversing the curve display area 31. To this end, a vertical scan position counter 120 is provided which has a count input terminal 120a connected by a conductor 122 to the output terminal 94B of the synchronizer and timing control circuit 94. The output generated at the output terminal 94B is shown in FIG. 6B and comprises a negative pulse 123 generated just after the beginning of beam trace lines 152, 154, 156, ... 214, i.e. during each traverse of the beams over the even numbered beam line positions within the curve display area 31.

When the beams reach the upper frame line of beam display area 31, i.e. beam line position No. 151, the count in the vertical scan position counter 120 is zero. This represents the maximum amplitude point of the curve display area 31. As the beams move successively along beam line positions Nos. 152, 154, 156 ... 214, the number stored in the vertical scan position counter will increase during each such line period one count until the maximum count of 31 appears therein. The next pulse fed thereto, i.e. the 32nd pulse, resets the vertical scan position counter to zero. Thus, the progressively increasing count of the vertical scan position counter 120 represents progressively decreasing amplitudes in the curve display area 31.

The vertical scan position counter has a 5-bit binary output appearing at the output terminals 120b which output is coupled by lines 123 to corresponding binary signal input terminals 127a of a comparator 127. The comparator 127 has another group of binary input terminals 127a' extending to the binary coded output terminals 104b of the shift register 104. When the binary signals fed to the input terminals 127a and 127a' are identical, the output appearing at the output terminal 127b of the comparator will drop from a normal initial zero value to a given negative value. This signal is coupled by a conductor 129 to an input 131c of a video signal adder 131. The video signal adder 131 adds together various signals fed thereto, and the summation output appearing at an output terminal 131g thereof is coupled by a conductor 133 to the video input 135a of the modulator 135 which produces a video or test frequency carrier at an amplitude proportional to the magnitude of the output of the video signal adder 131.

It should, thus, now be apparent that as the beam traces proceed along the various contiguous beam line position Nos. 152, 154, 156, etc., of the curve display area, the various test carrier response signals stored in the shift register, which are numbers from zero through 31, are presented to the input terminals 127a' of the comparator 127. At the point where this comparison occurs, the main video carrier produced by the modulator 135 will be suitably modulated to produce a bright display spot at the appropriate point and the appropriate amplitude level of the curve display area 31.

The comparator 127 has another output terminal 127b' at which output voltage changes from an initial gate closing to a gate opening value when the binary signals fed to the input terminals 127a' from the output of the shift register 104 is a number greater than the number represented by the binary coded signals fed to the input terminals 127a of the comparator 127 from the output of the vertical scan position counter 120. The output terminal 127b' is coupled by a conductor 138 to the input terminal 140a of a gate 140 which when opened couples a signal fed to input terminal 140a' thereof to its output terminal 140b. This signal is fed by a conductor 142 to the input terminal 131e of the video signal adder 131 associated with the modulator 135. The input terminal 140a of the gate 140 is connected by a conductor 150E to the output terminal 94E of the synchronizer and timing control circuit 94. FIG. 6E shows the output signal at the terminal 94E which comprises a number of negative marker pulses 147a, 147b, ... 147g which are generated during the movement of the beam traces along beam line positions Nos. 152–214. The negative pulses 147a, 147b, ... 147g respectively occur during the instants of time when the beams are passing over the frequency-assigned segments which produce the vertical frequency marker lines 34b, 34c, 38b, 38c, 38d, 38e, 38f and 36b, as shown in FIG. 1. The output signals of gate 140 thus produce a video carrier modulation which results in the frequency marker lines only below the response-indicating dots of the curve display area 31a of the receiver frequencies involved.

To produce the horizontal framing lines 31a and 31b at the upper and lower margins of the curve display area 31, the synchronizer and timing control circuit 94 is provided with an output terminal 94F at which appears the signal waveform shown in FIG. 6F. Output terminal 94F is connected by a conductor 150F to the input terminal 131j of the video signal adder 131. This waveform comprises a wide negative pulse 151 occurring when the beams are moving along beam line positions Nos. 151 and 215 and having a duration equal to the period it takes the beam traces to traverse the width of the curve display area 31.

The vertical frame lines 31c and 31d of the curve display area 31 provided by negative pulses 153a and 153b of the signal waveform shown in FIG. 6H appearing at the times indicated (namely during the movement of the beam traces along beam line position Nos. 152–214) at the output terminal 94H of the synchronizer and timing control circuit 94. This output terminal 94H is coupled by a conductor 150H to the input terminal 131h of the video signal adder 131.

The amplitude reference line 38g in the curve display area as shown in FIG. 1 is produced by the signals shown in FIG. 6 where a wide negative pulse 155 is generated during the movement of the beams over the selected beam line position for this line, which is shown as beam line position No. 184. This negative pulse 155 appears at the output 94G of the synchronizer and timing control circuit 94 and is coupled by a conductor 150G to the input terminal 131g of the video signal adder 131.

The increased background intensity given the magnified stop band sections 34 and 38 in the curve display area 31 as shown in FIG. 1 is provided by the output signal as shown in FIG. 6K having negative pulses 157a and 157b generated during the intervals when the beams are moving over the magnified trap sections 34 and 36 in beam line position Nos. 152–214. This output appears at output terminal 94K of the synchronizer and timing control circuit 94 and is coupled by conductor 150K to input terminal 131d of the video signal adder 131.

The synchronizing pulse portion of the amplitude modulated signal fed to the antenna input terminals 16–16' is produced by control signal waveform shown in FIG. 6J which includes the irregular pulses 160 occurring at the beginning of each sweep line which these pulses initiate when processed by the receiver circuitry. These synchronizing pulses 160 are positive pulses rather than negative pulses, as in the case of the adder input signals previously described. The waveform shown in FIG. 6J appears at the output terminal 94J of the synchronizer and timing control circuit 94 and is coupled by a conductor 161 to input terminal 131f of the video signal adder 131.

As previously described, in the particular television system for which the exemplary form of the invention being described is designed, the greater the amplitude of the video or test frequency carrier, the less intense or blacker will be the beam trace intensity appearing on the face of the cathode ray tube 14. The basic amplitude level of the carrier frequency produced by the modulator 135 is determined, in the exemplary circuit being described, by a continuous DC positive bias fed to video signal adder input terminal 131b or the connection thereof to a source of biasing potential 163. This biasing potential is adjusted to produce a video carrier frequency amplitude as shown in FIG. 3, which establishes a background intensity on the face of the cathode ray tube which is below the black level producing amplitude. During the generation of the synchronizing pulses 161 shown in FIG. 6J, the video signal adder will add these positive pulses to the positive DC voltage coupled to the video signal adder input terminal 131b to produce a video carrier which is in excess of the black level producing amplitude. Moreover, all of the other previously described signals fed to the video signal adder 131 which effect a readily visible beam trace on the face of the cathode ray tube 14 being negative signals will subtract from the biasing voltage signal produced by the DC voltage source 163, thereby producing a video carrier signal of a sufficiently low amplitude as to produce a bright beam trace on the face of the cathode ray tube.

As shown in FIGS. 3A and 3B, the amplitude of the momentarily generated test carrier frequency signals F1 and F2, as illustrated, is below the black level line 42 to a greater extent than is the amplitude of the video carrier frequency signal. This is true for the test carrier frequencies assigned to the pass band response section 38 of the curve display area 31 where the receiver has a significant response to the test frequencies involved. However, to aid in the tuning of the trap circuits where the response of the receiver is very minimal, and in accordance with a specific aspect of the present invention as previously indicated, for those test frequencies which fall within the stop band trap frequency sections 34 and 36 of the curve display area, the amplitude of these test carrier frequency signals is desirably made adjustable to a level many times greater than that of the other test carrier frequency signals as shown in FIGS. 3A and 3B, so that a significant detectable voltage will appear at the output of the video detector of the television receiver from which signals beam trace spots of detectably different levels will appear on the curve display area 31 of the cathode ray tube for the various test frequencies involved. In effect, the scale factor of the magnified stop band sections is increased greatly over that present in the pass band response section 38. Thus, during the period when the beam traces are moving over the test frequency response display area 21 of the cathode ray tube, where the test carrier frequency is one which produces an IF frequency which is assigned to the magnified stop band frequency sections 34 and 36 of the curve display area 31, a signal is fed to the input terminal 131a of the video signal adder 131 which will be a positive signal which will produce the desired magnified test frequency carrier amplitude. Similarly, during the period that the beams move over the test frequency response display band area 21 and the test carrier frequencies involved fall within the pass band response area 38 of the curve display area 31, a signal is fed to the input terminal 131a of the video signal adder 131 to produce the amplitudes for the frequencies F1 and F2 shown in FIGS. 1 and 3. This is achieved by feeding a negative pulse of suitable amplitude to the input terminal 131a.

To this end, a positive DC voltage source 165 is provided whose positive terminal is connected to the input terminal 167a of a 3-input "and" gate 167, and a negative DC voltage source 169 is provided whose negative terminal is connected to the input terminal 170a of a gate 170. (If it is desired to eliminate the magnification of the response curve in the stop band sections 34 and 36 of the curve display area 31, switches 166 and 168 can be provided which disconnect the negative voltage source 165 from the input to the gate 167 and the stop band section background intensity increasing signal output terminal 94K from the video signal adder.) The synchronizer and timing control circuit 94 has an output 94L shown in FIG. 6J which is fed by conductor 173 to the input terminal 167a' of a gate 167 and input terminal 170a' of gate 170 which is slaved to gate 167 to the extent that gate 170 will operate independently of gate 167 except when gate 167 is opened, whereupon gate 170 will be closed. As shown in FIG. 6L., the waveform at output terminal 94L is a wide negative pulse 171 occurring when the beams are moving over the test frequency response display area 21 in beam line position Nos. 20–30. This negative voltage will open the gate 170 and prepare the gate 167 for opening when a negative pulse appears at a third input terminal 167a" of the gate 167.

The input terminal 167a" is connected by a conductor 172 to the output terminal 174b of a decoder matrix 174. The decoder matrix 174 has five binary input terminals 174a extending to the five binary output terminals 116b of IF oscillator frequency counter 116, which has a count therein which identifies the particular test carrier frequency being generated during the field period involved. The decoding matrix 174 is designed to produce a gate opening pulse at the output terminal 174b thereof for those counts in the counter 116 assigned to the frequencies with responses indicated in the stop band segments 34 and 36 of the curve display area 31. Thus, the gate 167 will be open during the generation of the negative pulse 174 shown in FIG. 6L during those fields when the test carrier frequency falls within the stop band sections 34 and 36 referred to.

When the gate 170 is open, as described, a negative DC voltage appears at the output terminal 170b of the gate 170 which is coupled by conductors 175 and 177 to the video signal adder input terminal 131a.

When the gate 167 is open during the time that the test carrier frequencies are generated assigned to the stop band sections 34 and 36 of the curve display area 31, a positive voltage appears at the gate output terminal 167b which is coupled to the input terminal 179a of an adjustable DC amplifier 179. The DC amplifier 179 has an adjusting knob 181 which varies the degree of DC amplification of the amplifier 179. The DC amplifier 179 has an output terminal 179b which is coupled by the aforementioned conductor 177 to the video signal adder input terminal 131a. Thus, depending upon the adjustment of the amplification of the DC amplifier 179, a desired positive voltage will appear at the output of the DC amplifier during those fields when the test carrier frequency generated during the field involved is assigned to the stop band sections 34 and 36 of the curve display area 31.

The video frequency carrier is generated by any suitable carrier frequency generator means including a manually controlled variable frequency oscillator 180 having a manual control 182 for selecting any one of a number of different frequencies generated by the oscillator 180, which frequency when subtracted from the output from a fixed frequency oscillator 183, produces the various desired video carrier frequencies for the different channels selected by the manual control 182. The fixed frequency oscillator has an output terminal 183a coupled to the input 185a of a gate 185. The gate 185 has an output terminal 185b coupled by conductor 187 to the input terminal 182a" of a mixer 182. The variable frequency oscillator 180 has an output terminal 180b connected to the input terminal 182a of the mixer 182. The mixer produces at its output terminal 182b the signal representing the difference in the frequencies of the output of the variable frequency oscillator 180 and the fixed frequency oscillator 183. In the example of the present invention being described, the fixed frequency oscillator operates at the IF carrier frequency of 45.75 megahertz. The gate 185 is slaved to operate with a gate 184 so that when the gate 184 is opened, the gate 185 is closed, and when the gate 184 is closed, the gate 185 is opened. The gate 184 has an output terminal 184b connected to the input terminal 182a' of the mixer 182 and has an input terminal 184a' connected to the output terminal 186b of a phase lock loop oscillator 186 which preferably operates over the same frequency range as the IF frequencies indicated in FIG. 1, namely over the range from 39.75 megahertz to 47.25 megahertz. This provides the additional features that the signal generator portion can be arranged to provide a direct IF test signal which can be inserted at the mixer input of the TV receiver. Thus, it is possible to display the response of the IF amplifier portions of the receiver independent of the RF tuner effect on the overall response. This is helpful in analyzing a poorly responding receiver wherein the malfunction can be isolated between the IF and RF amplifier portions of the receiver. The gate 184 has an input terminal 184a coupled by a conductor 186 to the line 173 extending to the output 94L of the synchronizer and timing control circuit 94, at which appears a gate opening pulse when the beams are moving within the test frequency response display band area 21 of the cathode ray tube.

It is apparent, therefore, that when the gate 185 coupled to the fixed frequency oscillator 183 is opened, the output of the mixer 182 appearing at output terminal 182b thereof will be the selected video carrier frequency, and when the gate 184 is opened, the output of the mixer will be at the particular test carrier frequency determined by the output of the phase lock loop oscillator at the moment involved. The output terminal 182b of the mixer 182 is coupled to the input terminal 135a' of the modulator 135 which produces an output at an amplitude determined by the magnitude of the signal fed to the video input terminal 135a, as previously described. The modulator 135 has output terminals 135b and 135b' to which are connected the aforementioned conductors 18 and 18' extending to the antenna input terminals 16–16' of the television receiver.

The phase lock loop oscillator 186 is a well known component which has binary signal input terminals 186a which receive a binary signal which varies in number from zero to 31 in the example of the invention being described. The phase lock loop oscillator produces a frequency output in the range of IF frequencies previously referred to of a value proportional to the numbers zero through 31 fed in binary signal form to the input thereof. The binary signal input terminals 186a of the oscillator 186 are connected by suitable line 188 to the binary signal ouputs of the aforementioned IF oscillator frequency counter 116 so that the desired test carrier frequency is produced, (obviously, the phase lock loop oscillator may be replaced by a more complex multi-frequency oscillator system which selects a desired frequency output through a binary signal decoding matrix.)

It is apparent that the present invention provides an exceedingly convenient test apparatus for determining and displaying the frequency response of a television receiver to the various television channels and, where necessary, to facilitate the adjustment thereof.

It should be understood that numerous modifications may be made in the exemplary form of the test apparatus described, without deviating from the broader aspects of the invention. For example, while in the most practical form of the invention the screen of the cathode ray tube attached to the test receiver is used to display a rectangle of light representing the response of the receiver circuits to the test carrier frequencies and a curve of the response of the receiver to the various test carrier frequencies, in accordance with a broad aspect of the invention, the cathode ray tube referred to need only display the rectangle of light or the response curve. In these cases, additional equipment would be necessary to display the response curve, to respond to the output of the video detector (which would require access to the video detector output of the receiver). However, such modified response testing systems would still have advantages over the response testing systems of the prior art. Additionally, the present invention provides a unique response display curve with uniquely located reference frequency markers and the capability of selective and/or progressive magnification of the response of the frequencies associated with the trap circuits, which feature has utility independently of the other features of the invention which simplified the connections of the test equipment to the television receiver.

I claim:

1. Television receiver response test apparatus comprising: signal generating means for generating an amplitude modulated video carrier frequency signal with an envelope including spaced synchronizing pulses for producing a synchronous picture producing-like beam sweeping over the face of a cathode ray tube of the television receiver to be tested and envelope portions including the synchronizing pulses which produce a stabilized automatic gain control circuit operation in the receiver and a given reference background intensity on the face of the cathode ray tube, carrier modifying means for periodically interrupting during the beam aweep field periods the frequency of the video carrier of said video carrier frequency signal during limited time intervals thereof, and during said video carrier frequency interruptions, providing test carrier frequencies of a predetermined amplitude, which produce a display over at least one test frequency response display area on the face of said cathode ray tube, and the frequency of which progressively changes to encompass the desired frequency band of the television channel involved, wherein the brightness of the display produced on said test frequency display area is a measure of the over all response of the television receiver to the test carrier frequency involved, light sensor means to be mounted in front of said cathode ray tube opposite said test frequency display area for generating a signal which is a measure of the brightness of the display involved, storing means coupled to said light sensor means for storing information on the successive values of the output of said light sensor means as said test carrier frequency is varied, and response indicating means responsive to the information stored on the values of the signals generated by said light sensor means for producing an indication of the overall response of the television receiver circuits to said varying test carrier frequencies.

2. The television receiver response test apparatus of claim 1 wherein the carrier modifying means repeatedly progressively modifies at least some of the frequency of said test frequency carrier so that at least part of said frequency band of the television channel involved is repeatedly scanned, whereby said response data producing means is continuously updated, to aid in the adjustment of the tuned circuits of the receiver.

3. The television receiver response test apparatus of claim 1 wherein said carrier modifying means modifies the frequency of said test frequency carrier in timed relation to said synchronizing pulses.

4. The test apparatus of claim 1 wherein said response indicating means includes means for modulating the video carrier signal generated by said signal generating means to produce on a portion of the face of said cathode ray tube spaced from said test frequency response display area a curve showing the response of the receiver to said test carrier frequencies.

5. The television receiver response test apparatus of claim 4 wherein the test carrier frequencies in the stop band portions of said frequency band of the television channel involved are generated at a much greater amplitude than that of the frequencies therebetween, so the test apparatus effects the display of the response curve with a magnified amplitude for the frequencies of said stop bands, to facilitate the elevation and tuning of the trap frequency circuits of the television receiver.

6. The television receiver response test apparatus of claim 4 wherein said carrier modifying means includes means for selectively providing test frequency carriers with a progressively greatly increased amplitude at the stop band portions of said frequency band of the television channel involved, so the test apparatus effects the display of the response curve with a selected magnified amplitude for the frequencies in the stop bands.

7. Television receiver response test apparatus comprising: signal generating means for substantially continuously generating an amplitude modulated video carrier frequency signal with an envelope including spaced synchronizing pulses for producing a synchronized television picture producing like beam sweeping across the face of a cathode ray tube of the television receiver to be tested and envelope portions including the synchronizing pulses which produce a stabilized automatic gain control circuit operation in the receiver and a reference background intensity on the face of the cathode ray tube, carrier modifying means for periodically interrupting during the beam sweep field periods the frequency of the video carrier of said video carrier frequency signal during limited time intervals thereof, said carrier modifying means during said video carrier frequency signal interruptions providing amplitude stabilized test carrier frequency signals which change progressively in timed relation to said synchronizing pulses to encompass the desired frequency band of the television channel involved, wherein the changing output of the tuned IF frequency amplifier stages of the receiver to said progressively varying test carrier frequencies indicates the frequency response of said tuned circuits to the test frequencies involved, means responsive to said changing output for storing information on the successive values thereof, and display producing means responsive to said stored information and including means for modulating the video carrier frequency signal generated by said signal generating means to produce on a portion of the face of said cathode ray tube a curve showing the response of the receiver to the various frequencies of said test carrier portions of said amplitude modulating signal.

8. The television receiver response test apparatus of claim 7 wherein there is provided means for selectively increasing the amplitude of said curve in the stop band regions thereof, to facilitate the tuning of the trap frequency circuits of the television receiver.

9. The television receiver response test apparatus of claim 7 wherein said carrier modifying means provides test carrier frequency signals with an increased amplitude only in the stop band portions of said frequency band of the television channel involved, so the test apparatus effects the display of the response curve with a magnified amplitude for the frequencies in the stop band portions of said frequency band, to facilitate the evaluation and tuning of the trap frequency circuits of the television receiver.

10. The television receiver response test apparatus of claim 7 wherein the carrier modifying means repeatedly progressively modifies the frequency of said test frequency carrier so that said frequency band of the television channel involved is repeatedly scanned, whereby said display producing means is continuously updated to aid in the elevation and adjustment of the tuned circuits of the receiver.

11. The television receiver response test apparatus of claim 10 wherein said carrier modifying means includes means for selectively adjusting to a selective level the amplitude of the test carrier frequency signals in the stop band portions of said frequency band of the television channel without disturbing the amplitude of the other frequencies of the test carrier frequency signals.

12. Television receiver response test apparatus comprising: signal generating means for generating an amplitude modulated fixed frequency video carrier signal with envelope portions which produce a stabilized automatic gain control circuit operation in the receiver to be tested, carrier modifying means for periodically interrupting the frequency of said video carrier signal during limited time intervals thereof and during said video carrier signal interruptions providing amplitude stabilized test carrier frequency signals which progressively change to encompass the desired frequency band of the television channel involved, wherein the changing response of tuned IF frequency amplifier stages of a receiver under test to said progressively varying test carrier frequency signals indicates the frequency response of said tuned circuits to the test frequencies involved, means responsive to a signal indicative of said changing output of the tuned IF amplifier stages for storing information on the successive values thereof, and response indicating means responsive to said stored information for producing an indication of the overall response of the television receiver circuits to said varying test carrier frequencies.

13. The television receiver response test apparatus of claim 12 wherein said response indicating means includes means for displaying said information on the face of a cathode ray tube in the form of a curve.

14. Frequency response test apparatus for a tuned circuit to be tested, said apparatus comprising: signal generating means for generating an amplitude stabilized test carrier frequency signal which changes progressively to scan the frequency response band of the tuned circuit under test involved, wherein the changing output of the tuned circuits to be tested to said progressively varying test carrier frequency signal indicates the frequency response thereof to the test frequencies, means responsive to a signal indicative of said changing output of the tuned circuit for storing information on the successive values thereof, response indicating means responsive to said stored information for displaying said information on the face of a cathode ray tube in the form of a curve showing the variation in response of the various test frequencies involved, and response curve modifying means for selectively increasing the amplitude of said response curve only at the margins of said frequency band, so the test apparatus effects the display of the response curve with a magnified amplitude for the frequencies adjacent the margins of said frequency band.

15. The test apparatus of claim 14 wherein said response curve modifying means effects the generation of the test frequencies only at the marginal portions of said frequency band with a greatly increased stabilized amplitude.

16. The test apparatus of claim 14 wherein there is provided means for distinguishing the portions of said curve at the marginal portions thereof having an increased amplitude from the other portions of the curve.

17. The test apparatus of claim 16 wherein said last mentioned means varies the background intensity of the beam traces on the face of said cathode ray tube adjacent the marginal portion of said curve.

18. The test apparatus of claim 17 wherein there is provided intensity control means for providing vertically spaced data at selected reference test frequency points in said curve display which data extend only below and from the response indicating dot for the test frequency involved to a point adjacent to the bottom margin of the curve display area.

19. Test apparatus for providing a display on the face of a cathode ray tube which is the response curve of a tuned circuit under test which is to be tuned by aid of such apparatus, said test apparatus comprising: means for producing a varying test frequency signal which progressively varies in discrete steps over the spectrum of frequencies involved and for feeding said varying frequency signal to the input of said tuned circuit, means responsive to the varying output of said tuned circuit due to the varying frequency signals fed to the input thereof for storing in a data register data on the output of said tuned amplifier circuit for said different frequencies, means for generating a signal effecting the synchronized movement of a cathode ray tube beam horizontally across the face of said cathode ray tube to form horizontal sweep lines proceeding progressively vertically along the tube face to scan at least two vertically spaced portions of the tube face once each sweep frame period, horizontal scan position counter means which has a count which follows and identifies the movement of the beam along discrete horizontally spaced segments to which are assigned the various test carrier frequencies of said test frequency signal, frequency counter means which has a count therein corresponding to the test frequency generated at the moment involved, comparator means responsive to the count in said horizontal position counter means and the count in said frequency counter means for controlling the reading of data indicating the output of said tuned circuit into said data register at appropriate points thereof so the pattern of information in said data register corresponds in position to the test frequency to which said information applies, vertical scan counter means whose count varies with the vertical movement of the sweep lines of the beam of said cathode ray tube over one of said positions of said cathode ray tube face forming a curve display area thereon and indicates various amplitude levels corresponding to the amplitude variations possible in the data stored in said data register, means responsive to the count stored in said vertical position counter means and the data stored in said data register for controlling the intensity of the beam moving across said curve display area of the cathode ray tube to provide a series of dots having a vertical position in said curve display area corresponding to the stored data and a horizontal position in said curve display area indicating the test frequency for which the display dot indicates the response of the tuned circuit thereto.

20. The test apparatus of claim 18 wherein said tuned circuit under test is a television receiver including said cathode ray tube, said signal generating means and feeding means comprising an amplitude modulating signal generating system which generates a video carrier frequency signal with synchronizing pulses for causing the beam of said cathode ray tube to scan synchronously the face of the cathode ray tube and a test frequency carrier signal during periodic interruptions in said video frequency carrier signal which test carrier frequency signal progressively varies in frequency repeatedly to scan the frequency band of the television receiver, the response of the television receiver to said test frequency carrier signal of varying frequency being a display on one portion of the face of the cathode ray tube whose intensity varies with the response of the receiver to the test frequency carrier being generated at the instant involved, and there is provided light sensor means for responding to the varying intensity of said display on the face of the cathode ray tube, means responsive to the output of said light sensor means for storing said data in said data register under control of said comparator means, and said means responsive to the count stored in said vertical position counter means being a means for modulating the video frequency carrier of said amplitude modulated signal generating system to produce said display dots on the face of said cathode ray tube.

21. A method of testing the response of a television receiver having the usual antenna input terminals, automatic gain control circuits and tunable IF frequency circuits, and a cathode ray tube, the method comprising the steps of: placing a light sensor means in front of a test frequency response display area extending over a limited portion of the face of said cathode ray tube so a curve display area of the cathode ray tube is exposed to the view of the operatior or another portion of the cathode ray tube face, feeding to the antenna input terminals of the television receiver an amplitude modulated signal having a main video carrier portion with an envelope including spaced synchronizing pulses for producing a synchronous beam sweeping across the cathode ray tube face, which envelope produces a stabilized automatic gain control circuit operation in the receiver and a given reference background intensity on the cace of the cathode ray tube, said amplitude modulated signal also including test frequency carrier portions with an envelope which produces a display over said test frequency response display area adjacent said light sensor means, the carrier frequency of said test frequency carrier portions of said amplitude modulating signal being periodically progressively varied to encompass the frequency band of the television channel involved; storing data on the output of said light sensor means; and modulating the video carrier frequency portion of said amplitude modulated signal fed to said signal input terminals in response to said stored data to reproduce an overall response curve of the television receiver to said various test carrier frequencies on said curve display area of said cathode ray tube.

22. The method of claim 21 wherein at least sone of said test frequency carrier portions of said amplitude modulated signal are repeatedly progressively varied so as to repeatedly scan at least parts of the frequency band of the television channel involved, so said overall response curve produced on said curve display area of said cathode ray tube represents the continuously updated response of at least portions of the tuned IF frequency circuits of the receiver; and said method comprising the further step of tuning said portions of said IF frequency circuits as said response curve is viewed on said curve display area of the cathode ray tube.

* * * * *